(12) United States Patent
Benway

(10) Patent No.: US 7,861,502 B1
(45) Date of Patent: Jan. 4, 2011

(54) TOP ADJUSTING LINKAGE FOR LEVELING A MOWER DECK

(75) Inventor: Randy E. Benway, Horicon, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/556,251

(22) Filed: Sep. 9, 2009

(51) Int. Cl.
*A01D 34/00* (2006.01)

(52) U.S. Cl. .................................. 56/17.1; 56/10.8

(58) Field of Classification Search .............. 56/17.1, 56/15.9, 14.9, DIG. 22, 10.8, 15.8, 16.3, 56/320.1
See application file for complete search history.

(56) References Cited

U.S. PATENT DOCUMENTS

| | | | |
|---|---|---|---|
| 4,829,754 A * | 5/1989 | Shimamura et al. | 56/15.9 |
| 5,337,543 A * | 8/1994 | Kitamura et al. | 56/10.8 |
| 5,351,467 A * | 10/1994 | Trefz et al. | 56/16.3 |
| 5,797,252 A * | 8/1998 | Goman | 56/17.2 |
| 5,816,033 A * | 10/1998 | Busboom et al. | 56/10.8 |
| 6,237,957 B1 * | 5/2001 | Takekata et al. | 280/781 |
| 6,427,430 B1 | 8/2002 | Swartzendruber | |
| 6,588,188 B2 * | 7/2003 | Dennis | 56/16.3 |
| 6,658,831 B2 * | 12/2003 | Velke et al. | 56/14.7 |
| 6,837,032 B1 | 1/2005 | Swartzendruber et al. | |
| 7,213,662 B2 * | 5/2007 | Crumly | 180/6.48 |
| 7,448,191 B2 * | 11/2008 | Elhardt et al. | 56/17.1 |
| 7,540,134 B1 * | 6/2009 | Reich | 56/17.1 |
| 7,540,135 B2 * | 6/2009 | Strope | 56/17.1 |
| 7,578,117 B2 * | 8/2009 | Shaffer et al. | 56/17.1 |
| 7,607,283 B2 * | 10/2009 | Wright et al. | 56/17.1 |
| 7,614,207 B2 * | 11/2009 | Elhardt et al. | 56/17.1 |
| 2003/0094071 A1 * | 5/2003 | Eavenson et al. | 74/562 |
| 2006/0090442 A1 * | 5/2006 | Komiya et al. | 56/14.7 |
| 2007/0169456 A1 * | 7/2007 | Komorida et al. | 56/17.1 |
| 2009/0183481 A1 * | 7/2009 | Lancaster et al. | 56/17.1 |

* cited by examiner

*Primary Examiner*—Árpád Fábián-Kovács

(57) ABSTRACT

A top adjusting linkage for leveling a mower deck includes a generally vertically aligned lift rod connecting a pair of pivotable arms supporting the mower deck. One of the lift arms may be pivotably connected to a deck lift pedal. The lift rod has an effective length between the pivotable arms, and an engageable upper end to change the effective length. A fender deck with an access hole is provided directly above the upper end of the lift rod, so that an operator can engage the upper end of the lift rod.

10 Claims, 3 Drawing Sheets

TOP ADJUSTING LINKAGE FOR LEVELING A MOWER DECK

FIELD OF THE INVENTION

This invention relates to mower decks suspended from lawn and garden tractors and other grass mowing machines, and more specifically to a linkage that may be used to properly level and align a mower deck at a specified cutting height.

BACKGROUND OF THE INVENTION

A mower deck may be suspended from a lawn and garden tractor or other vehicle, or "floated" on wheels attached to the mower deck. The mower deck may cover one or more rotary cutting blades. When a mower deck is suspended from a vehicle frame, the mower deck and blades should be in proper alignment relative to the mowing vehicle at all cutting heights. For example, the mower deck should be properly aligned so that each rotary cutting blade is level side-to-side, and has a slight forward angle or "rake." Proper alignment of the mower deck helps achieve better cut quality, prevents grass frazzling, provides better grass dispersal, better bagging results, and reduces the power required to run the engine. Additionally, the mower deck should be calibrated so that the blades are at the cutting height specified by the mower deck height control knob or lever.

For example, measurements can be taken from a hard, level floor or ground surface under the vehicle up to the tip of a rotary cutting blade. To check if the mower deck is level side-to-side, the blades may be manually rotated to a position parallel to the vehicle axle and measurements are taken from the ground up to the left and right outside blade tips. The blades may be considered level side-to-side if the left and right measurements are within about ⅛ inch of each other. To check if the mower deck is properly aligned front-to-rear, the blades are rotated to point straight forward and backward, and measurements are taken from the ground up to the front and rear blade tips. The blades are considered properly aligned front-to-rear if the front blade tip is about ⅛ inch to about ½ inch lower than the rear blade tip. This may be referred to as "rake."

After the measurements, one or more adjustments may be made on the linkages between the mower deck and vehicle frame. For example, to level the mower deck side-to-side, a nut or other connector on the left-hand lift link may be turned to raise or lower the left side of the mower deck. Similarly, to properly align the mower deck front-to-rear, yokes or other connectors between the front of the mower deck and vehicle frame may be adjusted in either direction to lift or lower the front of the mower deck. The linkages may include threaded hangers, cams, or slotted mounting brackets attaching the deck to the vehicle frame. Leveling and rake adjustment may be repeated until the height of the cutting blades corresponds to the cutting height designated on the mower deck height control knob or lever.

In the past, accessing these linkages was done by reaching around the mounting and drive components between the mower deck and fender deck. However, it is difficult for most operators to access the proper adjustment linkage and make adjustments using a wrench or similar tool. As a result, deck leveling is a slow and uncomfortable task that is often neglected or performed inadequately, resulting in uneven cut quality.

A convenient and simple adjustment mechanism is needed for leveling a mower deck. An adjustment linkage is needed that reduces, minimizes or eliminates the necessity of reaching around the mounting and drive components on a mower deck.

SUMMARY OF THE INVENTION

A top adjusting linkage for leveling a mower deck comprises a deck lift pedal connected to a pivotable lift arm for raising and lowering the mower deck, a draft arm pivotably attached to the mower deck, and a lift rod connecting the lift arm to the draft arm and having an upper end that is engageable to change the spacing between the lift arm and the draft arm. A fender deck includes an access opening through which the engageable upper end of the lift rod may be accessed by the operator.

DESCRIPTION OF THE PREFERRED EMBODIMENT

Figure 1:
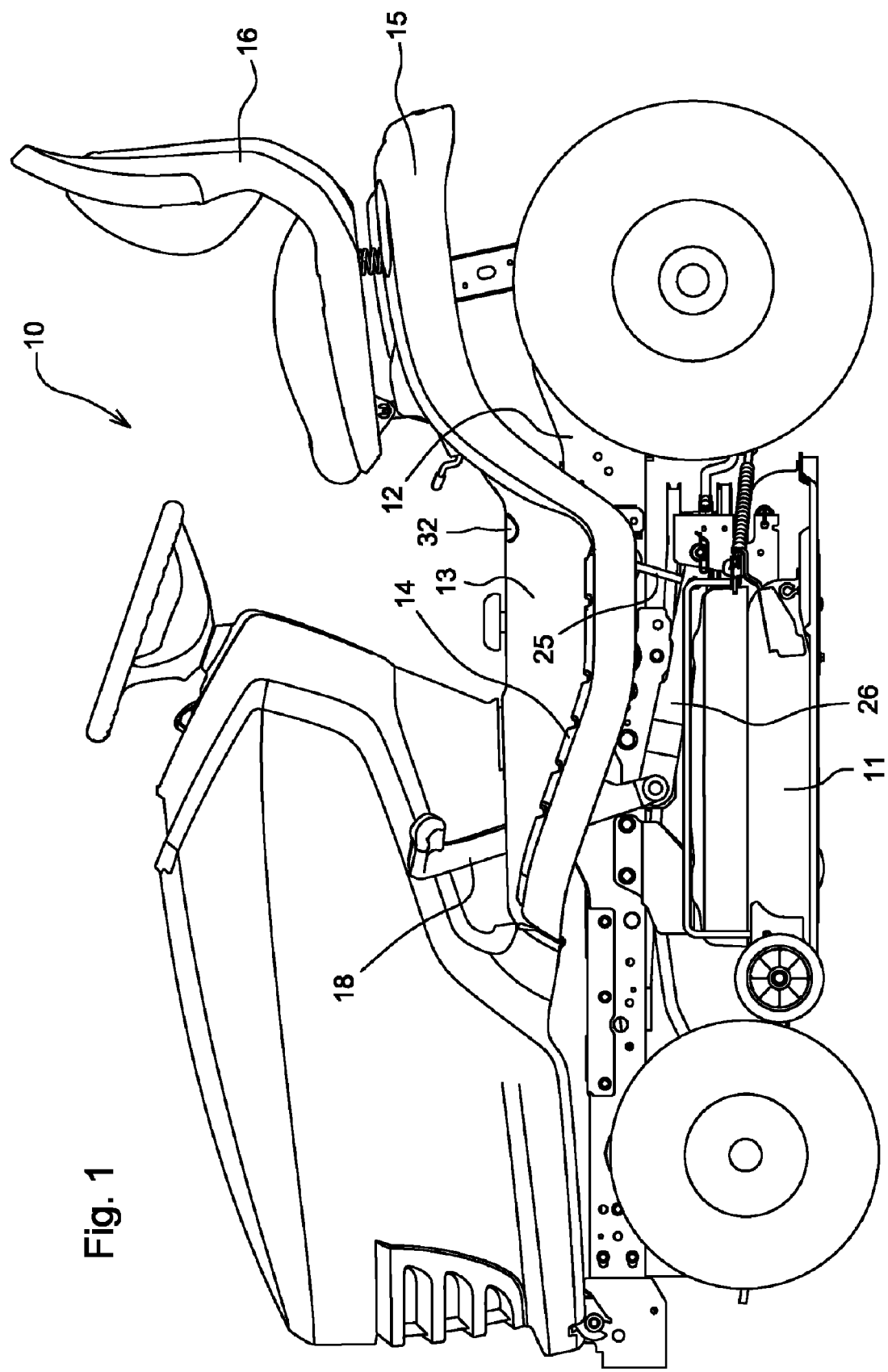
FIG. 1 is a side view of a lawn and garden tractor with a top adjusting linkage for leveling a mower deck according to one embodiment of the invention.

FIG. 1 shows lawn and garden tractor 10 having mower deck 11 suspended from the vehicle between the front and rear wheels. The mower deck may be under the longitudinal frame rails 12. The lawn and garden tractor may include fender deck 13 mounted to the frame. The fender deck may be a one piece molded plastic shell, or a composite or sheet metal structure. The fender deck may include left and right footrests 14, fenders 15, and an operator station where seat 16 may be positioned and mounted.

In one embodiment, the mower deck may be suspended from the frame rails with a four bar linkage. The mower deck may cover one or more rotary cutting blades on generally vertical shafts driven by an engine drive shaft and a belt and pulley arrangement. Optionally, the mower deck may have anti-scalp wheels. The anti-scalp wheels may be less than about one inch above the ground surface when mowing.

Figure 2:
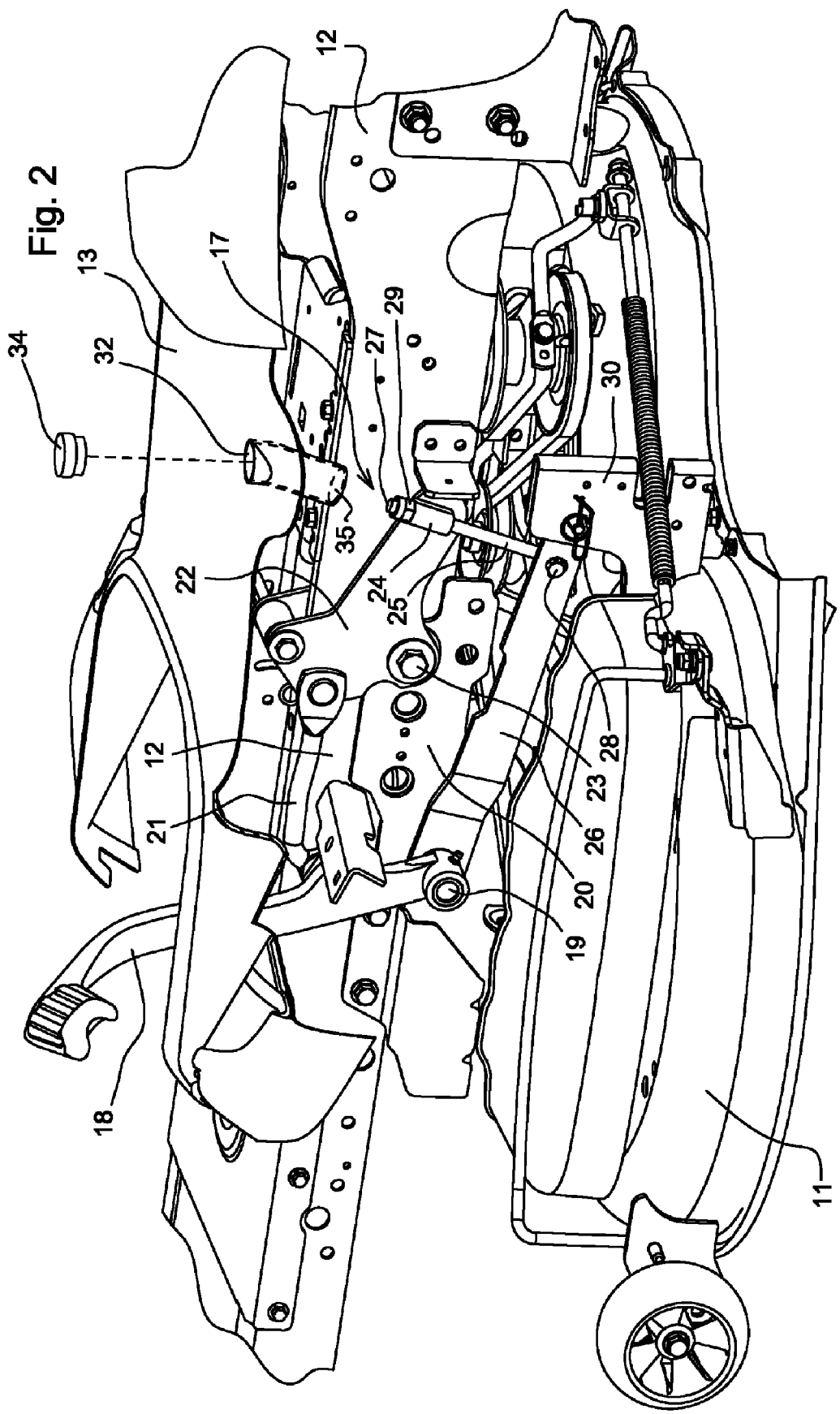
FIG. 2 is a perspective view of a mower deck with a top adjusting linkage for leveling the mower deck according to a first embodiment.

In one embodiment, the operator may use deck lift pedal 18 to raise and lower the mower deck between a mowing position and a transport position. As shown in FIG. 2, the deck lift pedal may be mounted on pivot axis 19 on plate 20 secured to or adjacent frame rail 12. Pedal connecting rod 21 may be pivotably mounted between deck lift pedal 18 and lift arm 22. A pair of lift arms 22 may be mounted on lift shaft 23 which extends laterally across the vehicle frame between the pair of frame rails. When the operator uses the deck lift pedal to raise or lower the mower deck, both lift arms attached to the opposing ends of the lift shaft may pivot together.

In one embodiment, top adjusting mower linkage 17 includes lift rod 25 that is generally vertically aligned and connects each lift arm 22 to a draft arm 26. The upper end 27 of lift rod 25 may be pivotably fastened to the lift arm, and the lower end 28 may be pivotably fastened to the draft arm. In the embodiment of FIG. 2, the upper end 27 of the lift rod may be pivotably fastened to the lift arm using lift link 24. Lift link 24 may be a cast sleeve that is pivotably mounted to the outer end of the lift arm, and the upper end of the lift rod may be inserted through the lift link. The lower end 28 of the lift rod may be inserted through an opening in the draft arm adjacent the end of the draft arm connected to draft tower 30, and fastened with a washer and clip. Each of the upper and lower ends of the lift rod can pivot on axes that are parallel to the lift shaft.

In one embodiment, the upper end of the lift rod, or an adjustment nut on the upper end of the lift rod, may be engaged with a tool to change the effective length of lift rod 25. An adjustment may be performed to increase or decrease the spacing between each lift arm 22 and draft arm 26. An operator may perform this adjustment to align and level the mower deck by accessing the upper end of the lift rod from above the mower deck and fender deck. An adjustment tool may be inserted through an access opening 32 in the fender deck to engage the upper end of the lift rod, or an adjustment nut threaded thereto.

Figure 3:
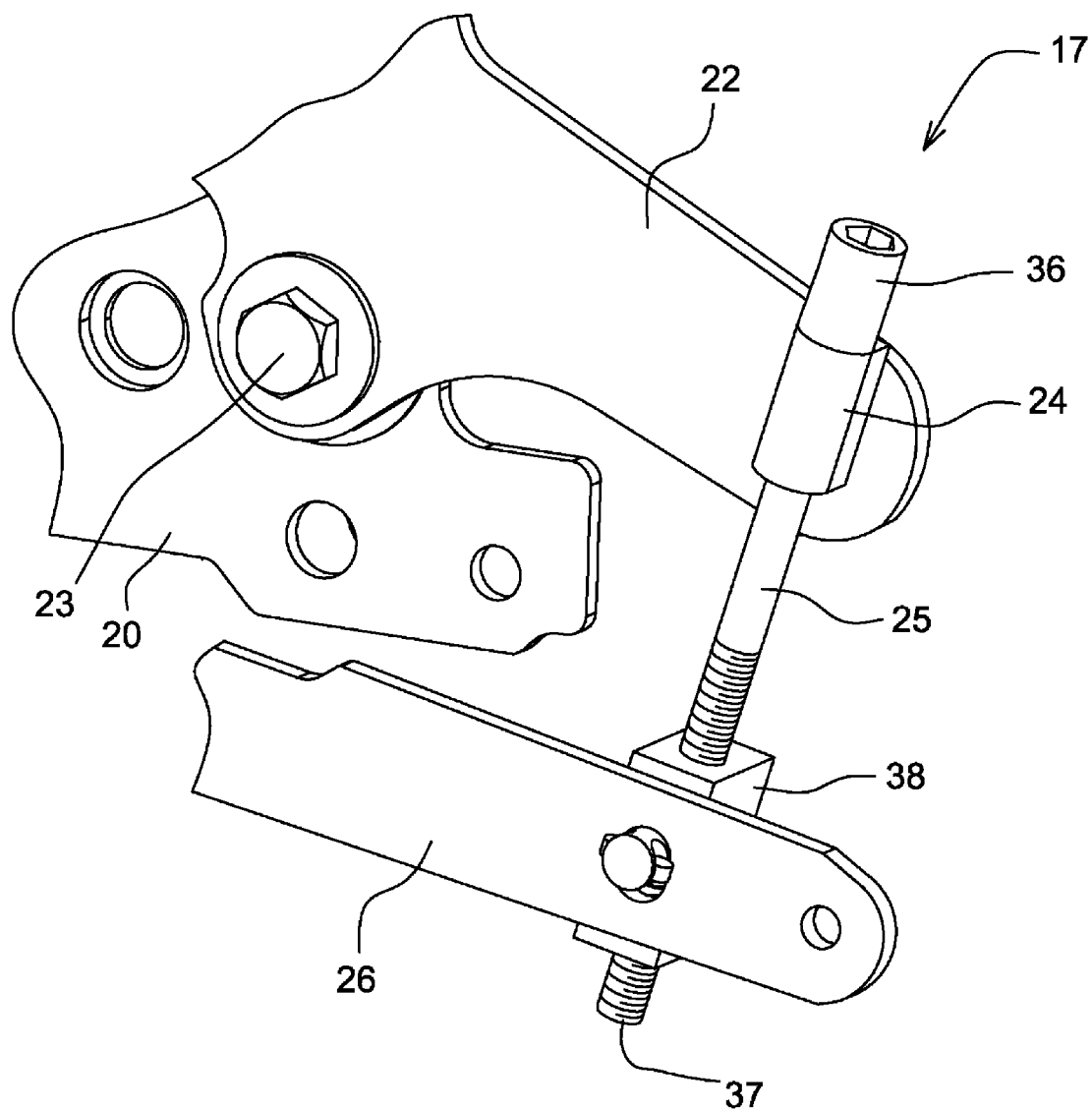
FIG. 3 is a perspective view of a top adjusting linkage for leveling a mower deck according to a second embodiment.

In the embodiment of FIG. 2, adjusting nut 29 may be threaded to the upper end of each lift rod. The adjustment nut may have a hex head that the operator may access and rotate with a socket wrench extending through access opening 32 in the fender deck. In the embodiment of FIG. 3, the upper end of the lift rod is provided with cap screw 36 that may be rotated with an Allen wrench inserted through opening 32. The lower end 37 of the lift rod may be externally threaded through internally threaded lift link 38 that is pivotably mounted to draft arm 26.

An operator may perform adjustments to align and level the mower deck by inserting a tool through access opening 32 through the fender deck directly above the upper end of the lift rod. Each access opening 32 in the fender deck may be at or adjacent each footrest 14. Removable plug 34 may cover the opening when not in use. Optionally, guide sleeve 35 may be attached to the fender deck to extend downwardly from the opening and help guide the adjustment tool into engagement with the adjusting nut or upper end of the lift rod.

Having described the preferred embodiment, it will become apparent that various modifications can be made without departing from the scope of the invention as defined in the accompanying claims.

The invention claimed is:

1. A top adjusting linkage for leveling a mower deck, comprising:
   a belly mounted mower deck under a fender deck on which an operator station is positioned;
   a deck lift pedal connected to a pivotable lift arm;
   a draft arm pivotably attached to the mower deck;
   a lift rod connecting the lift arm to the draft arm and having an upper end underneath the fender deck that is engageable to change the spacing between the lift arm and the draft arm; and
   an access opening through the fender deck directly above the engageable upper end of the lift rod.

2. The top adjusting linkage of claim 1 wherein the lift rod is pivotably connected between the lift arm and the draft arm.

3. The top adjusting linkage of claim 1 wherein the lower end of the lift rod is threaded to a lift link pivotably mounted to the draft arm.

4. The top adjusting linkage of claim 1 further comprising a removable plug in the access opening.

5. A top adjusting linkage for leveling a mower deck, comprising:
   a fender deck positioned over the mower deck and having a pair of footrests, a pair of fenders and an operator station for mounting an operator seat;
   access openings through the fender deck adjacent each footrest; and
   a pair of lift rods with lower ends connected to draft arms supporting the mower deck and upper ends connected to pivotable lift arms that raise and lower the mower deck; the upper ends under the fender deck and being engageable by inserting a tool from above the fender deck through the access openings to change the spacing between the draft arms and lift arms.

6. The top adjusting linkage of claim 5 further comprising a pair of frame rails under the fender deck to which the lift arms are pivotably mounted.

7. The top adjusting linkage of claim 5 further comprising a sleeve pivotably mounted to each of the lift arms, the upper ends of the lift rods extending through the sleeves.

8. A top adjusting linkage for leveling a mower deck, comprising:
   a generally vertically aligned lift rod connecting a pair of pivotable arms supporting the mower deck, one of the lift arms pivotably connected to a deck lift pedal;
   the lift rod below a fender deck and having an effective length between the pivotable arms and having an engageable upper end to change the effective length; and
   the fender deck having an access hole directly above the upper end of the lift rod; the access hole positioned for a tool to extend therethrough to reach from above the fender deck to engage the upper end of the lift rod below the fender deck.

9. The top adjusting linkage of claim 8 wherein the upper end of the lift rod extends through a sleeve mounted to one of the pivotable arms.

10. The top adjusting linkage of claim 8 wherein the lift rod is pivotably mounted to one of the lift arms.

\* \* \* \* \*